C. F. QUICK.
SPRING WHEEL FOR VEHICLES.
APPLICATION FILED MAR. 1, 1909.
967,553.
Patented Aug. 16, 1910.
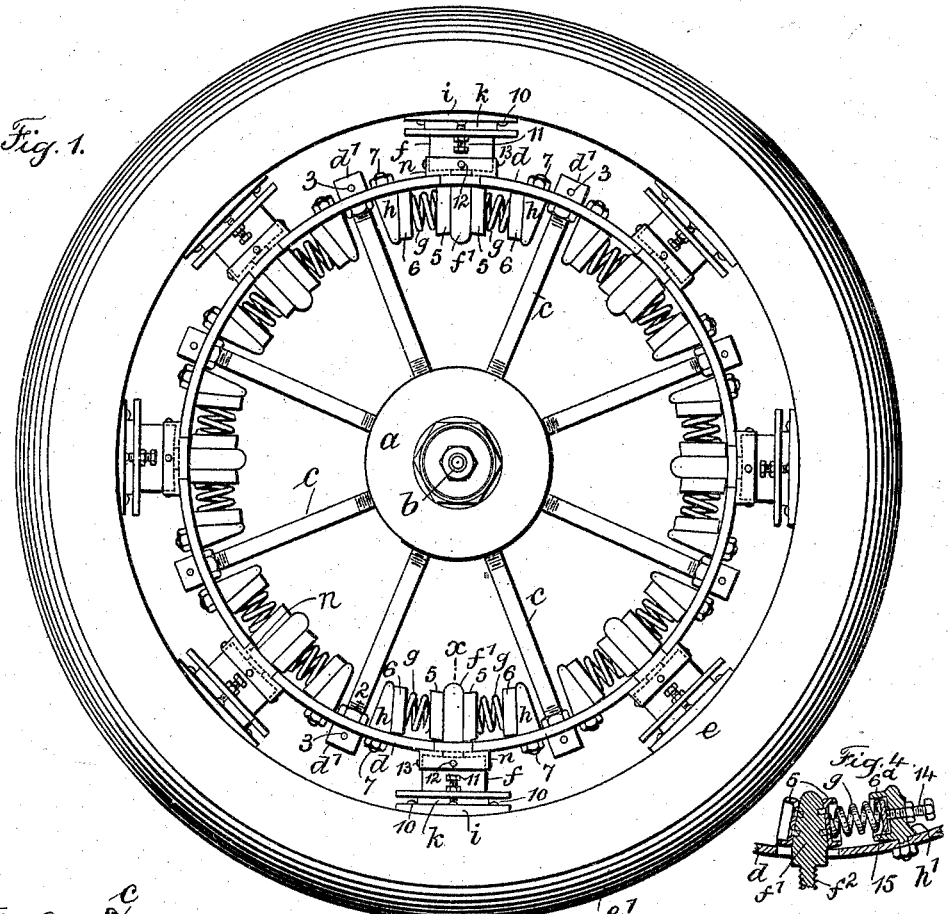
Charles F. Quick
by Harold Serrell
his atty.

UNITED STATES PATENT OFFICE.

CHARLES F. QUICK, OF YONKERS, NEW YORK.

SPRING-WHEEL FOR VEHICLES.

967,553.  Specification of Letters Patent.  Patented Aug. 16, 1910.

Application filed March 1, 1909. Serial No. 480,703.

*To all whom it may concern:*

Be it known that I, CHARLES F. QUICK, a citizen of the United States, residing at Yonkers, in the county of Westchester and State of New York, have invented an Improvement in Spring-Wheels for Vehicles, of which the following is a specification.

My invention relates to improvements in wheels for vehicles and particularly to wheels for automobiles, with the object of compensating both for the strain of weight compression, and the strain of driving torsion.

In carrying out my invention and in combination with a hub, radial spokes and a rim or annulus, I provide a tire of circular cross section and hollow, and at spaced apart intervals connecting the rim and tire are devices which yield radially for the weight applied and which yield substantially tangentially of the rim for the driving strain or torsion. The tire is preferably of substantially unyielding metal with any desired arrangement of tread surface, and the yielding devices are springs preferably of helical form and the devices associated with said springs and the manner of arranging the same are all hereinafter more particularly set forth.

In the drawing, Figure 1 is an elevation of a complete wheel according to my invention. Fig. 2 is a vertical section in the plane of the wheel showing so much of the spring devices as are necessary for a complete understanding of the invention in view of the fact that all of the spring devices of the several series are alike and duplicate. Fig. 3 is a cross section at about the dotted line $x, x$, of Fig. 1, and Fig. 4 is a longitudinal section showing a modification.

A suitable hub $a$ adapted to surround an axle or shaft $b$ is provided with radial spokes $c$ and an endless rim $d$. The spokes are screwed into the hub or secured in any desired manner and they pass through openings in the rim $d$. Their free ends are advantageously threaded and the projecting parts of the said spokes beyond the rim $d$ are connected to the thimbles $d^1$, screwed onto the same and secured by pins 3, and one or more nuts 2 are threaded upon the spokes inside the rim $d$ and are forced against the inner surface of the rim co-acting with the thimbles $d^1$ to securely and rigidly hold the rim $d$ to the spokes $c$.

$e$ represents the tire with a tread surface $e^1$ of any desired character to grip the surface traveled over and prevent slipping. This tire is preferably formed of spring steel or other suitable metal. In cross section it is slightly more than semi-circular with a flattened outer and upper surface and the same is connected to the structure formed by the hub, spokes and rim, by the devices hereinafter described.

$f$ represents a socket member of cylindrical construction open at one end and closed at the other by a head of substantial thickness. A post $f^1$ is secured centrally to the socket member by its threaded stem $f^2$ which passes through the head portion of the socket member and extends beyond the head. The post passes through a slot 4 in the rim $d$, the length of which slot is in the plane of the wheel. This slot is shown in Fig. 2. The inner surface of the socket head is spaced away from the outer surface of the rim $d$, and in the rim $d$ parallel with the slot 4 and at either side of the slot are formed channels or ball-ways for the series of anti-friction balls 8, and grooves to receive said balls are also formed correspondingly in the upper or outer surface of the head in the socket member to provide not only for the bearing of the socket member against the rim $d$ but for the movement of the post $f^1$ through the slot 4 of the rim $d$. The surface of this head is concentric with the surface of the rim $d$, thus providing the essential even bearing.

Upon opposite sides of the post $f^1$ where the same projects within the boundary of the rim $d$ I secure saucer members 5 and I provide buffers $h$ in pairs between the respective spokes $c$ each provided with a bolt 7 passing through an opening in the rim, with a clamping nut against the outer surface of the rim, and upon the opposing faces of these buffers $h$ I secure or form integral therewith saucer members 6 and place helical springs $g$ between the opposed saucer members, which form sockets receiving the ends of the helical springs and prevent them becoming lost or displaced.

I provide packing gland members surrounding the socket members $f$ and secured to the inner surface of the tire $e$ and each composed of an annulus member $i$ fitting the opening in the tire and connected to the same securely by a series of screws 10. An annulus gland member $k$ fits within the annulus $i$ and is connected thereto by the exterior screw thread of the annulus $k$ and an interior screw thread in the annulus $i$, and between the inner bent end of the annulus $i$ which comes against the outer surface of the socket member $f$ and the inner end of the annulus gland $k$, is a packing to hold lubricating material for lubricating the exterior surface of the socket member $f$ and providing for the lubrication of said member, at the same time preventing a too free movement of the same in action. The outer flange of the gland $k$ is provided with locking bolts 11 preferably adapted to come down upon the heads of any opposite pair of the screws 10 for the two-fold purpose of applying tension to the gland $k$ to prevent turning, and pressure against the screws 10 to prevent the same working loose and insure the annulus $i$ being held by two opposite screws whether any of the others loosen or not as the result of vibration in use.

Within each socket member $f$ is a helical spring $l$ and on the interior surface of the tire where each helical spring $l$ bears thereon, there is provided a flat seat $e^2$. Within the socket member $f$ I provide a cap plate 9, the outer surface of which is adapted to come against the end of the threaded portion $f^2$ of the post.

In the operation of the device of my improvement, the helical springs $l$ yield to compensate for the weight upon the wheel. The driving strain applied to the axle or shaft $b$ and communicated therefrom to the hub $a$, spokes $c$ and rim $d$ is applied against similar series of the helical springs $g$ according to the direction of rotation of the wheel and these are compressed. This action causes an expansion of the opposite series of helical springs $g$ and a movement through the slots 4 of the rim $d$ of the several posts $f^1$ in starting the machine. As soon as the pressure applied to the similar series of springs $g$ is equal to the power applied to drive the vehicle, the tire $e$ and the several parts connecting the same with the posts $f^1$ will turn with the hub, the spokes and the rim $d$, and the machine will move forward. As the machine gains headway and the rotation of the wheel becomes more constant, the momentum set up will help to reëstablish an equilibrium or a condition of substantially equal pressure between the respective series of helical springs and bring the several posts $f^1$ to more nearly a central position. The torsion of starting the machine by applying power to the driving wheel is thus partially absorbed and the machine started without a jerking motion.

The two series of anti-friction balls 8 in the raceways provided in the inner surface of the socket member $f$ and the outer concentric surface of the rim $d$ serve to insure and steady the turning movement and reduce the friction of the tire and the parts connected therewith in relation to the rigid rim and also to prevent transverse displacement.

I prefer to employ a bolt 12 passing transversely through each socket head and stem $f^2$ to insure the connection of the parts and to employ a sheet metal casing $n$ surrounding the inner end of each socket member $f$ and extending to contact with the rim $d$ and held in place by screws 13 and a bolt 12, so as to cover the antifriction balls and their grooves and keep out dust, dirt and water.

As the tire $e$ is of metal it is of course entirely free from any liability of injury from the surface of the road, and as the wheel is adapted to yield both for weight compression and driving torsion, the same elastic or resilient effect is produced as with a pneumatic tire.

In the form of my invention shown in Fig. 4, the buffers $h^1$ are secured in place to the rim $d$ the same as the buffers $h$ in the other figures, these buffers $h^1$ however are made integral with the saucer members $6^a$ and are provided with a bolt 14 and internal disk 15 for applying tension to the helical spring $g$ according to the work required of the springs.

I claim as my invention:

1. In a spring wheel for vehicles, the combination with a rim, of a tire of metal of more than semi-circular form in cross section, with a flattened inner surface having spaced apart openings, annulus gland members secured to the tire at said opening, a socket member passing through each of the said gland members, a helical spring within each socket member and bearing surfaces therefor, and devices connected to each socket member and to the rim respectively for connecting the tire and the rim and which devices have a spring function for taking up the driving torsion.

2. In a spring wheel for vehicles, the combination with a rim, of a tire of metal of more than semi-circular form in cross section, with a flattened inner surface having spaced apart openings, annulus gland members secured to the tire at said opening, a socket member passing through each of the said gland members, a helical spring within each socket member and bearing surfaces therefor, a post connected to each socket member and passing through a slot formed in the rim in the direction thereof and extending within the rim, buffer members secured to the rim within the boundary thereof and upon opposite sides of the post, saucer members connected respectively to the buffers and to the post, and helical springs received within the saucer members which act as retainers for the spring.

3. In a spring wheel for vehicles, the combination with a rim slotted in the direction of the rim at spaced intervals, posts passing through said slots and devices for connecting the posts to the rim in a yielding relation, socket members open at one end and having a head at the other end and connected at said heads to said posts, oppositely disposed rows of anti-friction balls in grooves respectively in said rim and said head coming at opposite sides of said posts providing for the movements of the posts and socket members over the curved outer surface of the rim, a tire of hollow formation adapted to receive the socket members, means secured to the tire and surrounding and guiding the socket members for maintaining a movable relation of the socket members with the tire and at the same time preventing lost motion, and spring devices within said socket members and bearings therefor within the socket members and against the interior surface of the tire.

Signed by me this 23d day of February 1909.

CHARLES F. QUICK.

Witnesses:
GEO. T. PINCKNEY,
E. ZACHARIASEN.